United States Patent Office 3,218,177
Patented Nov. 16, 1965

3,218,177
METHOD FOR THE PRODUCTION OF STARCH BASE JELLY CANDY
John W. Robinson, Blue Mound, and Frank H. Brock, Decatur, Ill., assignors to A. E. Staley Manufacturing Company, Decatur, Ill., a corporation of Delaware
No Drawing. Filed May 8, 1963, Ser. No. 279,008
18 Claims. (Cl. 99—134)

This is a continuation-in-part of U.S. application Serial No. 236,141, filed November 7, 1962, and now abandoned.

Our invention relates to new starch-base jelly candies and a method for their preparation. More particularly, our invention relates to new starch-base jelly candy cooking mixtures from which improved starch-base jelly candies can be obtained, and to an improved method for producing these starch-base jelly candies utilizing a composition containing a high percentage of amylose.

Starch-base jelly candies have long been manufactured by high temperature cooking of an aqueous dispersion of confectioners' cooking starch and sweetener. In accordance with modern and well-established candy making procedures, an aqueous dispersion of a conventional starch-base candy cooking mix is heated for a short period of time at temperatures in excess of those necessary to gelatinize or dissolve substantially all of the starch in the aqueous dispersion but not in excess of the temperatures at which the starch has a tendency to be degraded so as to cause the resulting candy to be less viscous. After cooking, the hot fluid candy mix is deposited into starch molds and allowed to "set." After setting, the candy is then ready for the final steps that may include coating, sugar sanding, packaging or immediate sale. However, starch-base jelly candy produced by conventional methods requires an extended time period, at least 24 hours and often in excess of 48 hours, to form a firm "set" and to dry sufficiently. In addition, starch-base jelly candies produced by the conventional methods tend to lose the desired "stringy" texture and become tough and rubbery after long storage periods thus making the candy unacceptable to the public. In fact, stringiness, which is the tendency of good quality starch-base jelly candy to form a long string at the point of separation when the candy is pulled apart, is often lost in a matter of just a few weeks of storage. Further, after extended periods of storage, conventionally made candy often tends to "fracture" or split sharply when pulled apart.

We have now provided a new method whereby starch-base jelly candy can be produced which will set in a matter of a very few hours and often, under certain conditions, in a matter of minutes. In addition, the starch-base jelly candy made according to our invention has much less tendency to lose its desired characteristics on storage than does conventional starch-base jelly candy produced by previous methods. Thus, our new method is not only economical in that it provides a much faster means for obtaining starch-base jelly candy but it represents an advance in the art of candy making.

Our new method generally comprises providing a hot fluid mixture containing from about 5 to about 10% by weight of starch and correspondingly from about 90 to about 95% by weight of sweetener, the weights on a dry substance basis, the said starch consisting essentially of amylose and amylopectin in proportion of 75:25 to 40:60, the said starch having been cooked at temperatures not less than 135° C. but not in excess of temperatures at which starch tends to be degraded. The cooking is carried out under superatmospheric pressure, in the presence of sufficient water to gelatinize or dissolve substantially all of the starch. Then the hot fluid mixture is concentrated to a water content of not substantially less than 16% and not substantially more than 22% by weight, based on the weight of the concentrate, and then starch-base jelly candies are formed from the concentrate. For the purpose of our invention, the terms "gelatinize" and "dissolve" have the same meaning.

In accordance with our invention, we cook the starch at temperatures ranging from about 135° C. to about 170–200° C., the higher temperatures being those at which starch tends to be degraded. However, we prefer to utilize temperatures in the range of from about 140 to about 165° C. Optimum results under most conditions are obtained utilizing temperatures ranging from about 145 to about 160° C. The cooking times required by our method can vary widely but most generally satisfactory results can be obtained using cooking times as low as a second and as high as several minutes. However, when we utilize temperatures in the higher portion of the stated temperature range, we prefer to use the shorter cooking times to minimize degradation of the starch whereas a temperature in the lower portion of the range permits a longer cooking time.

The percentage of starch in the starch-sweetener mixture can range from about 5 to about 10% by weight. However, for optimum results, we prefer to utilize from about 7 to about 9% of starch.

In carrying out the concentration step of our new method, it is necessary, in order to obtain a final product of high quality and quick "set," to concentrate the hot fluid mixture to a water content of from about 22 to about 16%. When a water content above 22% is obtained, the final candy tends to "sweat" when packaged thus causing the candies to stick together. On the other hand, when a water content of less than 16% is obtained, the hot fluid mixture tends to lose its fluidity and become viscid and otherwise hard to handle. The concentration step of our invention can be carried out utilizing any suitable method. One simple method consists of boiling the hot fluid candy mixture in an open cooking kettle at atmospheric pressure until the desired water concentration is obtained.

The candy forming step of our invention can also be carried out by utilizing any suitable procedure. For example, the candy can be cast in confectioners' molding starch or into metal molds. The candy can be cast into molds or molding starch at any suitable mold temperature; for example, the confectioners' molding starch or metal candy molds can be cooled to temperatures as low as on the order of −10 to 0° C. to obtain a particularly fast "set." It is generally not desirable to cast the candy into molds having temperatures in excess of 50° C. Under most circumstances, it is both preferable and economical to cast the candy into molds which are at room temperature.

The sweetener utilized in our invention can be any suitable sweetener which finds use in the making of starch-base jelly candy. For example, combinations of sucrose and corn syrup or combinations of sucrose, corn syrup and dextrose can be easily and conveniently utilized. The exact proportion of the ingredients in the sweetener will vary and naturally will depend upon the variety of candy desired.

The amount of water which can be satisfactorily utilized in our new method must be sufficient to dissolve or gelatinize substantially all of the starch at the temperatures utilized. We have generally found that the water content of the starch-base jelly candy cooking mixture should usually not be less than 30% by weight based on the weight of the total mixture and preferably should not be less than 40% by weight. Although it is not preferable, it is possible in our method to utilize as low as 16% water. By utilizing from 16 to 22% water, the concentration step can be eliminated. However, when such amounts of water are utilized, operation of the method at high temperature and pressures is necessary, thus presenting complicated problems involving expensive equipment and complicated operational technique. It will be apparent to the art that it is advisable to utilize amounts of water greater than 30% and to include the concentration step when carrying out our method. While it is conceivable that any amount of water even as high as 99% by weight would be operative in our invention, any amount of water greater than 50% by weight is merely excess which must be removed during the concentration step.

In order to obtain the advantages of our invention the previously stated proportions of amylose to amylopectin in the starch utilized are critical. When starch mixtures containing more than 75% amylose are utilized, the candy produced tends to be of poor texture and quality. When starch mixtures containing less than 40% amylose are employed, the candy produced has the properties of candy made by conventional methods. Conventional starches such as thin boiling confectioner's cooking starch previously utilized in the manufacture of the starch-base jelly candy contain only on the order of about 25% by weight of amylose. Generally, we prefer, in order to obtain optimum results, to use a starch or mixture of starches containing amylose and amylopectin in proportions of 70:30 to 50:50.

The starch utilized in our invention can be obtained from any suitable source. That is, the parent starch from which the amylose is obtained can be from the root, the stem or the fruit of a starch-producing plant, including potato, cassava, sorghum, sago and so on. We prefer to utilize starch derived from corn. For example, we can utilize starch which is obtained from the high amylose hybrid corns, for starches having about 45 to as high as 80% amylose are presently obtainable from hybrid corn. If a lower percentage of amylose is desired, the high amylose-containing starch obtained from hybrid corn can be blended with conventional confectioners' cooking starches with, of course, the proviso that the proper proportions of amylose to amylopectin are maintained in all starches utilized in our method. In addition, blends of substantially pure amylose (amylose having a purity of upwards of 85% obtained by the fractionation of starch) and conventional confectioner's starch can be utilized, again with the proviso that proper proportions of amylose to amylopectin are maintained. We have found that blends of substantially pure amylose and acid modified or oxidized thin boiling confectioner's starch, the said blends having proportions of amylose to amylopectin of about 65:35 to 50:50 are especially suitable for use in our invention. Defatted amylose (amylose treated to reduce the fat content below 0.5%) can be utilized in place of amylose which has not been treated to reduce or remove fat. Corn amylose normally contains about 2% fat. However, when defatted amylose or potato amylose is utilized, the optimum ratio of amylose to amylopectin can be as low as 45:55. Potato amylose normally contain on the order of about 0.3% fat.

The general method of our invention can be varied in several ways without altering the quality of the final candy product or its ability to "set" quickly.

Our most convenient method comprises cooking a starch-base jelly candy cooking mix containing from about 5 to about 10% by weight of starch and from about 90 to about 95% of sweetener by weight, the weights on a dry substance basis, in the presence of sufficient water to gelatinize substantially all of the starch, the starch consisting essentially of amylose and amylopectin in proportions of 75:25 to 40:60, then concentrating the cooked material to a water content of not substantially less than 16% and not substantially more than 22% by weight, based on the weight of the concentrate, and then forming starch jelly candy from the concentrate. As is customary, suitable coloring and flavoring agents may be added. It is generally preferable to add the flavoring and coloring agents after the concentration step of our process.

According to one alternative method, we can first gelatinize or dissolve the starch mixture containing proper proportions of amylose to amylopectin under the temperature conditions above described in the presence of sufficient water to obtain substantial gelatinization of the starch and then blend the thus gelatinized starch with a sweetener which has, preferably, been heated, in order to obtain a sweetener of uniform composition. The resulting candy cooking mix can then be concentrated, colored and flavored, and formed into candy as previously described.

In another alternative procedure, we can dissolve substantially pure amylose in water utilizing the previously described conditions and separately prepare an aqueous cooked starch-sweetener mix, using similar conditions, and then combine the amylose solution and the cooked aqueous starch-sweetener mix to form a hot fluid candy mixture, with the proviso that the resulting candy mixture contains the previously stated percentages of starch and sweetener and proportions of amylose to amylopectin. The resulting candy mix can also then be further concentrated, colored, flavored and cast according to our previously described method.

It has been found that when the substantially pure amylose or high amylose starch is separately gelatinized, the total amount of water necessary to be utilized in our entire procedure can be reduced to as low as 20% by weight based upon the weight of the hot fluid cooking mix without incurring equipment problems. However, it is preferable when utilizing this alternate method that the previously stated preferred amounts of water be maintained.

Our new method of producing improved starch-base jelly candy is adaptable to conventional pressurized cooking apparatus used in the confection industry. Both the steam injection type and the heat exchange type cookers can be satisfactorily utilized.

The following examples further serve to illustrate our invention; however, we do not intend to be limited to the details disclosed.

EXAMPLE I

A 160 lb. batch of starch-base jelly candy cooking mix containing the following ingredients:

| | Pounds |
|---|---|
| Sucrose | 40 |
| Corn syrup | 60 |
| High amylose corn starch (from hybrid corn containing about 60% amylose and 40% amylopectin) | 8 |
| Water | 52 | was preheated at about 82° C. with continuous stirring to obtain a uniformly blended aqueous dispersion. The aqueous dispersion was then cooked by passing through a continuous pressure cooker in which the dispersion was heated for a period of 1 minute at a temperature of about 150° C. The cooked aqueous dispersion was then immediately transferred to an open kettle and boiled to reduce the total water content to 20% of the total cooking mix. The thus concentrated material was then deposited into molds formed from molding starch, the molds having a temperature of about 25° C. and allowed to set for one hour. At the end of the one hour period, the candy was removed from the molds and was firm, of good texture and quality and ready for packaging.

EXAMPLE II

The procedure of Example I was followed with the exception that the following cooking mix was utilized:

| | Lbs. |
|---|---|
| Sucrose | 40 |
| Corn syrup | 60 |
| Starch blend (65% amylose, 35% amylopectin as blend of pure amylose and acid modified thin boiling corn starch) | 8 |
| Water | 52 |

Results similar to Example I were obtained.

EXAMPLE III

A 114.6 lb. batch of a mixture containing the following ingredients:

| | Lbs. |
|---|---|
| Sucrose | 40 |
| Corn syrup | 60 |
| Thin-boiling corn starch | 3.6 |
| Water | 11 | was preheated to about 82° C. with continuous stirring to obtain a uniform blend. The blend material was then cooked, by passage through a continuous pressure cooker, for a period of about one minute at a temperature of 138° C. The cooked material was then mixed with a solution that had been prepared by passing a dispersion of 4.4 lbs. of amylose in 16.0 lbs. of water through a continuous pressure cooker in which the dispersion was heated for a period of about one minute at a temperature of about 150° C. The combined mixture was immediately transferred to an open kettle and boiled to reduce the total water content to 18%. The concentrated material was then deposited into metal molds, the molds having a temperature of about zero degrees C. and allowed to set for 30 minutes. At the end of the 30-minute period, the candy was removed from the molds and was firm, of good texture and quality and ready for packaging.

EXAMPLE IV

A 110 lb. batch of sweetener containing the following ingredients:

| | Lbs. |
|---|---|
| Sucrose | 40 |
| Corn syrup | 60 |
| Water | 10 | was boiled until a uniform aqueous dispersion was formed. The aqueous dispersion was then combined with a starch composition prepared by passing a dispersion of 8 lbs. of a blend of pure amylose and thin boiling starch, the blend containing 55% amylose and 45% amylopectin, in 40 lbs. of water through a continuous pressure cooker in which the dispersion was heated for a period of about one minute at a temperature of about 155° C. The combined material was then boiled in an open kettle to reduce the total amount of water to about 21%. The concentrated blend was then deposited into molds at room temperature and allowed to set for about 2 hours. At the end of the 2 hour period, the candy was removed from the molds and was firm, of good texture and quality and ready for packaging.

EXAMPLE V

Candies were prepared according to the general method of Example I at 81–82% solids, utilizing starch blends of pure amylose and thin boiling starch. The jellies were removed from the molds after about one hour's "set," dried for ten minutes in air at 120° F. and packaged. These candies were tested for general texture and gel strength. The gel strength was determined on a Bloom gelometer by placing a cube-shaped piece of candy, within 24 hours after cooking, under a shot-weighted conical plunger and then observing the number of grams of shot necessary to depress the plunger 4 mm. into the candy. A gel strength of 55 to 70 was judged as an acceptable "set." At the same time, samples of candy were evaluated for string, tear resistance, bite and general mouth feel and were scored 3 for good, 2 for fair and 1 for poor. The following table shows the results of these tests.

*Table I*

| Candy | Percent and Type of Thin-Boiling Starch | Percent Pure Amylose | Percent Amylose In Blend | Gel Strength | Texture Evaluation |
|---|---|---|---|---|---|
| 1 | 42% acid-modified starch | 58 | 60 | 69 | 3 |
| 2 | 26% oxidized starch | 74 | 70 | 69 | 3 |
| 3 | 42% oxidized starch | 58 | 60 | 67 | 2 |
| 4 | 50% acid-modified starch | 50 | 55 | 69 | 3 |

EXAMPLE VI

Candies produced by each of the methods of Examples I–IV, inclusive, were packaged and then stored under normal storage conditions for a period of about 3 months. At the end of the storage period, the candies were tasted and found to be substantially unchanged from fresh candies.

Since many embodiments of this invention may be made and since many changes may be made in the embodiments described, the foregoing is to be interpreted as illustrative and our invention is defined by the claims appended hereafter.

We claim:

1. The method of making starch-base jelly candy which comprises providing a hot fluid starch-base jelly candy mixture containing not less than about 22% by weight water and correspondingly not more than 78% by weight of a mix, the said mix containing on a dry substance basis from about 90 to about 95% by weight of sweetener and correspondingly, from about 5 to about 10% by weight of gelatinized starch, the said starch consisting essentially of amylose and amylopectin in a ratio in the range of 75:25 to 40:60, the starch portion having been gelatinized at temperatures from about 135° C. to temperatures not in excess of temperatures at which starch tends to be degraded, in the presence of sufficient water to gelatinize the starch, concentrating the hot fluid mixture to a water content of from about 16 to 22% by weight on the weight of the concentrate and then forming candy jellies from the concentrated material.

2. A method of claim 1 wherein the percentage of starch ranges from about 7 to about 9%.

3. The method of claim 1 wherein the proportion of amylose to amylopectin is 70:30 to 50:50.

4. The method of claim 1 wherein the starch is a high amylose starch obtained from high amylose hybrid corn.

5. The method of claim 1 wherein the starch is a blend of substantially pure amylose and thin boiling starch, the ratio of amylose to amylopectin in the said blend being in the range 65:35 to 50:50.

6. The method of claim 1 wherein the amylose is selected from the group consisting of defatted amylose and potato amylose and the ratio of amylose to amylopectin ranges from 65:35 to 45:55.

7. The method of making a starch-base jelly candy which comprises cooking a candy mix containing on a dry substance basis from about 5 to about 10% by weight of starch and correspondingly from about 90 to about 95% by weight of sweetener, the said starch consisting essentially of amylose and amylopectin in a ratio in the range 75:25 to 40:60, at temperatures ranging from about 135° C. to temperatures not in excess of temperatures at which starch tends to be degraded in the presence of sufficient water to gelatinize substantially all of the starch, concentrating the cooked mix to a water content of from about 16 to about 22% by weight based on the weight of the concentrate, and then forming candy jellies from the concentrate.

8. The method of claim 7, wherein the proportion of amylose to amylopectin is 70:30 to 50:50.

9. The method of claim 7 wherein the starch is a high amylose starch obtained from high amylose hybrid corn.

10. The method of claim 7 wherein the starch is a blend of pure amylose and thin boiling starch, the said blend having proportions of amylose to amylopectin of from about 65:35 to 50:50.

11. The method of claim 10 wherein the amylose is selected from the group consisting of defatted amylose and potato amylose and the ratio of amylose to amylopectin ranges from 65:35 to 45:55.

12. The method of making starch-base jelly candy which comprises heating amylose in water at temperatures of from about 135° C. to temperatures at which starch tends to be degraded under superatmospheric pressures to form an aqueous amylose dispersion, cooking an aqueous mixture of sweetener and starch at temperatures to dissolve the starch, combining the aqueous amylose dispersion and the cooked mixture to form a hot, fluid mixture, the solids of said mixture consisting essentially of 90 to 95% sweetener by weight and correspondingly 5 to 10% starc and amylose by weight, the said starch and amylose content consisting essentially of amylose and amylopectin in a ratio in the range 75:25 to 40:60, the total water utilized being in an amount not less than 22% by weight of the hot fluid mixture, concentrating the hot, fluid mixture to a water content of from about 16 to about 22% by weight, based on the weight of the concentrate, and then forming candy from the concentrate.

13. The method of making starch-base jelly candy which comprises heating starch in water at temperatures ranging from about 135° C. to temperatures at which starch tends to be degraded, the said starch consisting essentially of amylose and amylopectin in proportions of 75:25 to 40:60, to form an aqueous starch dispersion, combining the aqueous starch dispersion with sweetener and water to form a fluid mixture, the water content being not less than 22% by weight on the weight of the fluid mixture, the sweetener-starch portion of the fluid mixture consisting of 90–95% sweetener and correspondingly 5–10% starch, on a dry substance basis, concentrating the fluid mixture to a water content of from about 16 to about 22% by weight of the concentrate and then forming starch-base jelly candy from the concentrate.

14. The method of making starch-base jelly candy which comprises providing a hot fluid starch-base jelly candy mixture containing from about 16 to about 22% water and correspondingly from about 78 to about 84% by weight of a mix, the said mix on a dry substance basis containing from about 90 to about 95% by weight of sweetener and correspondingly, from about 5 to about 10% by weight of gelatinized starch, the said starch consisting essentially of amylose and amylopectin in a ratio in the range 75:25 to 40:60, the starch portion having been gelatinized at temperatures from about 135° C. to temperatures not in excess of temperatures at which starch tends to be degraded in the presence of sufficient water to gelatinize the starch and forming candy jellies from the hot fluid mixture.

15. The method of claim 14 wherein the water ranges from about 20 to about 22%.

16. The method of making a starch base jelly candy which comprises providing a hot fluid starch-base jelly candy mixture containing from 16 to 22% by weight water and correspondingly from 78 to 84% by weight of a mix, the said mix containing on a dry substance basis from 90 to about 95% by weight sweetener and correspondingly from about 5 to about 10% by weight gelatinized starch, the said starch consisting essentially of amylose and amylopectin in a ratio in the range of 75:25 to 40:60, the starch portion having been gelatinized at temperatures from about 135° C. to temperatures not in excess of temperatures at which starch tends to be degraded in the presence of sufficient water to gelatinize the starch, depositing the said candy mixture in candy molds, the said candy mixture having a water content of not less than 16%, and causing the mixture to set to a firm starch base jelly candy in not more than 2 hours.

17. The method of claim 16 in which the molds are maintained at a temperature under 50° C.

18. The method of claim 16 wherein the amylose is substantially fat free.

References Cited by the Examiner

UNITED STATES PATENTS

| | | | |
|---|---|---|---|
| 2,678,276 | 5/1954 | North | 99—134 |
| 2,726,960 | 12/1955 | Bolanowski | 99—134 |
| 2,847,311 | 9/1958 | Doumak et al. | 99—134 |

OTHER REFERENCES

Winton et al.: "The Structure and Composition of Foods," Vol. I, John Wiley & Sons, Inc.; New York, 1932, pp. 25, 26.

A. LOUIS MONACELL, *Primary Examiner.*

UNITED STATES PATENT OFFICE

CERTIFICATE OF CORRECTION

Patent No. 3,218,177                              November 16, 1965

John W. Robinson et al.

It is hereby certified that error appears in the above numbered patent requiring correction and that the said Letters Patent should read as corrected below.

Columns 5 and 6, Table I, sixth column, lines 1 to 4 thereof should appear as shown below instead of as in the patent:

3
2
3
3 column 7, line 29, for "starc" read -- starch --.

Signed and sealed this 20th day of September 1966.

(SEAL)
Attest:

ERNEST W. SWIDER                             EDWARD J. BRENNER
Attesting Officer                                Commissioner of Patents